Dec. 19, 1922.
A. C. HAYWARD.
EGGBEATER.
FILED APR. 26, 1918.
1,439,102.
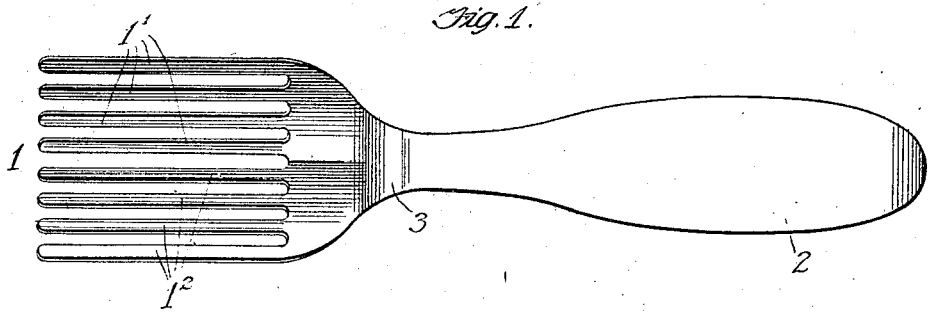
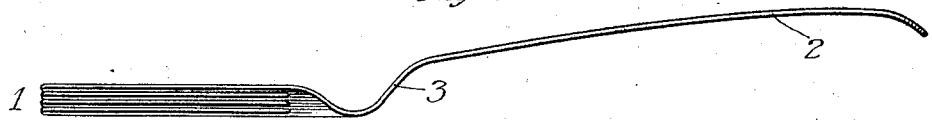
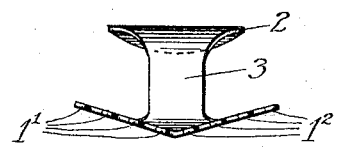
INVENTOR.
Agnes C. Hayward
BY
ATTORNEY.

Patented Dec. 19, 1922.

1,439,102

UNITED STATES PATENT OFFICE.

AGNES C. HAYWARD, OF CHICAGO, ILLINOIS.

EGGBEATER.

Application filed April 26, 1918. Serial No. 230,934.

*To all whom it may concern:*

Be it known that I, AGNES C. HAYWARD, a citizen of the United States, and resident of Chicago, in the county of Cook and State of Illinois, have invented a new and useful Eggbeater, of which the following is a specification.

This invention relates to egg beaters for beating or whipping eggs, batter and the like.

As is well known, the process of beating eggs, batter, etc., consists in working into the material to be beaten, air in the form of bubbles to render said material "light", the "lightness" of the material increasing with the quantity and size of said air bubbles.

I am aware that many different forms of beaters for the purpose specified have been devised and some of them have come into very extensive use, among the best and most widely known beaters being those known to the trade as the "Dover" and the "Universal". I have found in practice, however, that both of these beaters are ineffective as regards the number and size of the air bubbles which it is possible to incorporate into the material by means thereof—or, in other words, as regards the "lightness" of the material produced thereby.

The object of the present invention is to provide a beater for the purpose specified by means of which a largely increased quantity of air in the form of relatively very large bubbles may be incorporated into the material, as compared with any beater of which I have any present knowledge, resulting not only in a much greater bulk and greater "lightness" of the material beaten, but said beaten material will be much stiffer and more stable than when beaten with known beaters.

My improved beater is particularly effective for beating eggs, actual tests having demonstrated that approximately a one-third (⅓) increase in bulk is gained by the use of my beater as compared with known forms of rotary beaters. Also, batters may be greatly improved by the use of my improved beater, being rendered lighter in consequence of the number and size of the air bubbles.

A further advantage of my improved beater is that it may be easily cleaned, is thoroughly simple in operation, and cannot get out of order.

To effect this object, a beater of my invention may be described as a fork, comprising tines arranged to form series positioned in intersecting planes, said planes diverging from each other at an obtuse angle, a desirable angle for general use being about 140 degrees.

In the accompanying drawing, in which my invention is fully illustrated,

Figure 1 is a top plan view of my improved beater.

Figure 2 is a side view thereof, and

Figure 3 is an end view thereof looking towards the ends of the tines.

Referring now to the drawing, my improved beater, designated as a whole A, consists of a fork, comprising tines 1 and a handle 2, the connected base portion of said tines being preferably abruptly offset from the handle 2, as shown at 3, the extent of said offset being preferably such that the tines of the fork may be inserted substantially flatwise in a shallow dish, as a platter, in which the material to be beaten is contained.

In accordance with my invention, the tines 1 of the beater comprise two series designated $1^1$ and $1^2$, positioned, respectively, in intersecting planes, which diverge at an obtuse angle, a desirable angle for general use being approximately 140 degrees. The angle of divergence of the planes defined by said series of tines may be varied within wide limits, however, without departing from the contemplation and scope of my invention.

For most purposes, a desirable width for the sections of my improved beater, formed by the series of tines $1^1$ and $1^2$, respectively, is equal to the width of a usual table fork. The width thereof may, however, be varied as desired, within the scope of my invention.

Specifically, the handle 2 forms no part of my invention and may be of any desired size and shape being preferably of such size and shape that it may be conveniently grasped and held during the beating operation.

I claim:—

A beater for the purpose specified, comprising flat and substantially straight tines arranged in two series positioned in planes which intersect each other at an obtuse angle, the tines of each series lying in the plane defined by the series of tines to which they belong, respectively, substantially as described.

In testimony that I claim the foregoing as my invention, I affix my signature this 17th day of April, 1918.

AGNES C. HAYWARD.